United States Patent
Mohanty et al.

(10) Patent No.: US 8,359,037 B2
(45) Date of Patent: Jan. 22, 2013

(54) ADAPTIVE SLEEP AREA

(75) Inventors: Shantidev Mohanty, Santa Clara, CA (US); Muthaiah Venkatachalam, Beaverton, OR (US); Shailender Timiri, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 621 days.

(21) Appl. No.: 12/165,438

(22) Filed: Jun. 30, 2008

(65) Prior Publication Data

US 2009/0003255 A1 Jan. 1, 2009

Related U.S. Application Data

(60) Provisional application No. 60/947,375, filed on Jun. 29, 2007, provisional application No. 60/947,383, filed on Jun. 29, 2007.

(51) Int. Cl.
*H04W 40/00* (2009.01)
*H04W 72/00* (2009.01)
*H04W 24/00* (2009.01)

(52) U.S. Cl. ............... 455/445; 455/453; 455/456.4; 370/338

(58) Field of Classification Search ............ 455/445, 455/453, 456.4; 370/338
See application file for complete search history.

(56) References Cited

U.S. PATENT DOCUMENTS

| | | | |
|---|---|---|---|
| 7,283,496 B2 * | 10/2007 | Gurivireddy et al. | 370/331 |
| 7,574,223 B2 * | 8/2009 | Funato et al. | 455/458 |
| 7,751,835 B2 | 7/2010 | Sharma et al. | |
| 2002/0187793 A1 | 12/2002 | Papadimitriou et al. | |
| 2004/0136351 A1 * | 7/2004 | Omae et al. | 370/338 |
| 2004/0254980 A1 * | 12/2004 | Motegi et al. | 709/203 |
| 2005/0250474 A1 | 11/2005 | Hong et al. | |
| 2006/0286982 A1 * | 12/2006 | Prakash et al. | 455/435.1 |
| 2007/0055778 A1 | 3/2007 | Park et al. | |
| 2007/0086395 A1 | 4/2007 | Bakshi et al. | |
| 2007/0087767 A1 | 4/2007 | Pareek et al. | |
| 2007/0104156 A1 | 5/2007 | Inoue et al. | |
| 2007/0105600 A1 | 5/2007 | Mohanty et al. | |
| 2008/0003943 A1 * | 1/2008 | Maheshwari et al. | 455/11.1 |
| 2008/0261628 A1 * | 10/2008 | Proctor et al. | 455/458 |

OTHER PUBLICATIONS

"Notice of Allowance for U.S. Appl. No. 12/165,280", (Aug. 29, 2011), Whole Document.
"Office Action for U.S. Appl. No. 12/165,280", (Apr. 13, 2011), Whole Document.

* cited by examiner

*Primary Examiner* — Wen Huang
(74) *Attorney, Agent, or Firm* — Blakely, Sokoloff, Taylor & Zafman LLP

(57) ABSTRACT

Techniques for determining a sleep area of a sleep group in a wireless communications network based on a value of a dynamically changing communication characteristic. In various embodiments, a sleep area may be determined to reduce resource use in a wireless communication network supporting a sleep mode of a mobile station. In one embodiment, the sleep area may be determined based on a speed of a mobile station.

18 Claims, 5 Drawing Sheets

ADAPTIVE SLEEP AREA

RELATED APPLICATIONS

This application claims priority from Provisional Application Ser. No. 60/947,375, filed Jun. 29, 2007, entitled "Adaptive Sleep Area", the teaching of which is incorporated herein by reference. Applicants hereby cross-reference patent application Ser. No. 12/165,280 filed Jun. 30, 2008 entitled "ADAPTIVE PAGING AREA" which claims priority to Provisional Application Ser. No. 60/947,383, filed Jun. 29, 2007, entitled "ADAPTIVE PAGING AREA".

BACKGROUND OF THE INVENTION

1. Field of the Invention

The invention relates generally to communications in a wireless network. More particularly, various embodiments pertain to determining a size of a sleep area in a wireless network supporting broadband wireless communications.

2. Background Art

Various broadband wireless communications standards such as WiMAX (e.g. the Institute of Electrical and Electronics Engineers (IEEE) 802.16e-2005 standard, released Feb. 28, 2006) incorporate the concept of a "sleep mode". In a wireless network supporting such a standard, a base station (BS) servicing a particular geographic area may belong to a group of one or more BSs, referred to herein as a "sleep group" (SG), where the respective geographic areas of the one or more BSs define a "sleep area" (SA) of the sleep group. During an active traffic exchange, a mobile station (MS) serviced by the wireless network may be registered with (e.g. connected to) a particular BS of the geographic region in which the MS operates. The BS with which a MS is currently registered is referred to herein as a serving BS (SBS).

A sleep mode MS may maintain an association with its serving BS in order to send/receive traffic successfully. This association may consist of both static and dynamic information and states. By way of example, static information may include an MS's authentication and security credentials and/or information about an MS's service flows and connections. Some examples of static states may include an MS's data path from an Access Service Network (ASN) gateway to its serving BS. On the other hand, some examples of dynamic information include an MS's channel quality indicator (CQICH), an MS's transmission power and transmission delay parameters. Similarly, some examples of dynamic states may include states related to Automatic Repeat Request (ARQ) and hybrid ARQ (HARQ) operations etc. An SBS may assign a sleep ID (SLPID) to the MS when the MS transitions to a sleep mode from an active mode. The scope of the SLPID may be limited to coverage of the serving BS. Thus, when the sleep mode MS moves to the coverage area of another BS, it may be assigned a different SLPID. SLPID may be used to uniquely identify different sleep mode MSs within the coverage area of a particular BS.

When an MS and its SBS do not exchange traffic, there may be no need to maintain dynamic information and states for the MS. Sleep mode operation exploits this fact by putting the user into a low power operating mode in the absence of traffic exchange between an MS and its serving BS. In the absence of an active traffic exchange, the MS may switch to operating in a sleep mode to minimize MS power consumption and to decrease the usage of air interface resources. For example, a sleep mode MS may alternate between availability intervals (AI) and unavailability intervals (UAI). During an unavailability interval an MS may power down its radio interface(s). On the other hand, during availability interval the sleep MS listens for any traffic indicator message sent by its SBS to indicate the presence of traffic. The SBS may indicate the presence or absence of traffic for a sleep mode MS by sending a traffic indicator, referred to herein as a MOB_TRF-IND message, during an AI of the MS.

When an MS in active mode moves from the coverage area of its serving BS to the coverage area of another BS (referred to herein as a target BS), it may perform a handoff (HO) from its serving BS to the target BS. During the HO, the MS's static information and states may be transferred from the serving BS to the target BS. Moreover, as a part of handoff process, the MS may establish its dynamic information as well as states with the target BS. As mentioned earlier, dynamic information and states are not maintained for an SS in sleep mode. Thus, only static information and states are maintained for an SS in sleep mode. As long as the sleep mode SS resides in the coverage area of its serving BS's sleep group, no action is required to maintain its static information and states. However, when the sleep mode SS moves beyond the coverage area of its serving BS's sleep group, uncontrolled handoff (UHO) may be performed—e.g. to transfer only MS static information and/or states to the target BS. After successful completion of an UHO, the target BS may assign a new SLPID to the sleep mode MS.

Both air-link signaling messages (e.g., messages variously exchanged between the MS and its SBS and/or target BS) as well as backbone signaling messages (e.g., messages variously exchanged between an SBS and a target BS and/or other entities of a wireless communication network) may be used during a UHO. The generation, transmission, reception and/or processing of air-link signaling messages and/or backbone signaling messages results in consumption of resources of the wireless network. Limited network resources may result in a limited ability to implement a sleep mode for an MS and/or otherwise impact wireless network performance.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
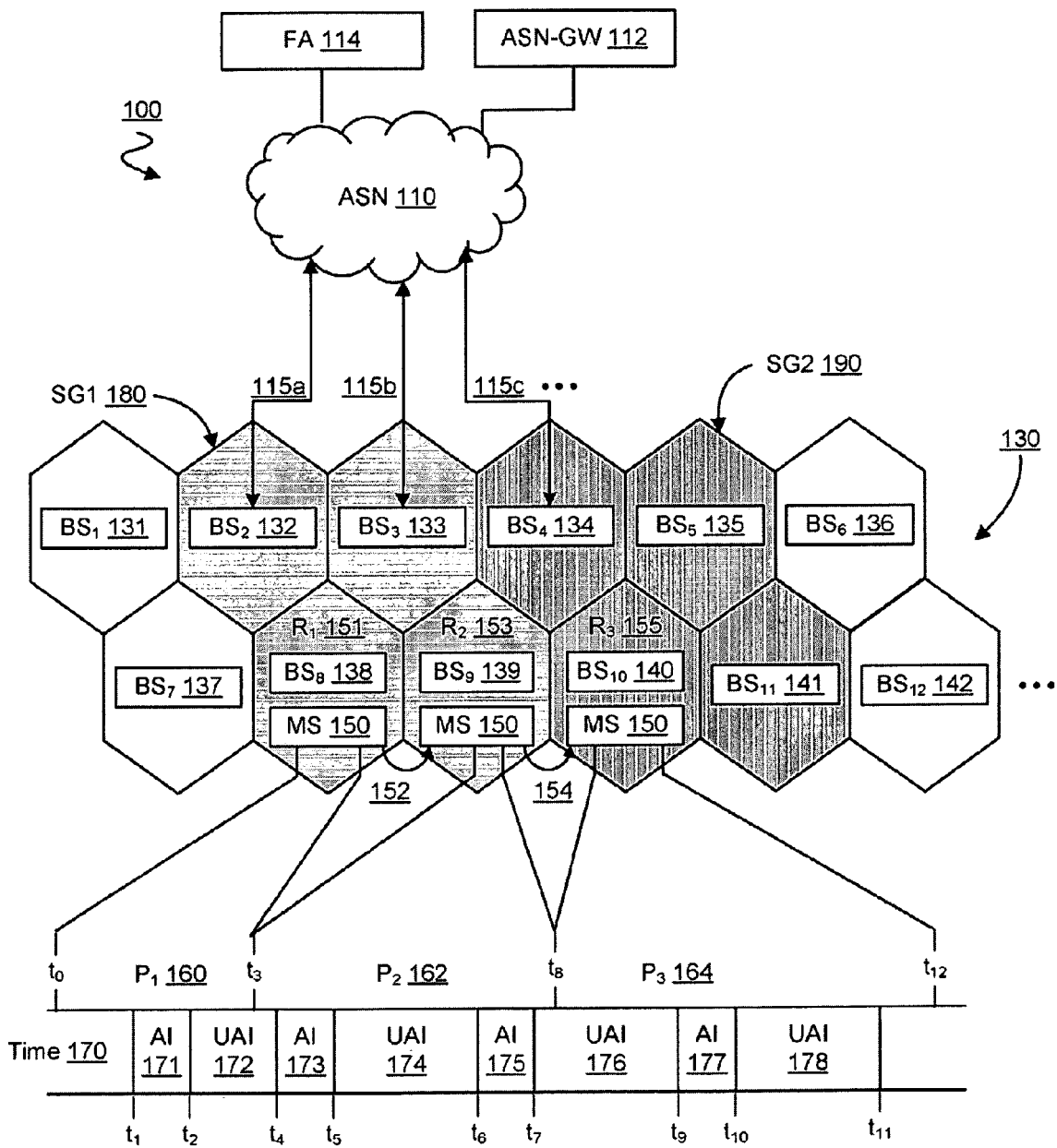
FIG. 1 is a block diagram illustrating a wireless communication network to implement current wireless communication techniques.

FIG. 1 illustrates a wireless communication network 100 according to existing wireless communication techniques. Wireless communication network 100 may support wireless communications compatible with a communications standard which supports sleep groups (SGs) such as IEEE 802.16e-2005e-2005. Wireless communication network 100 may include a set of cells 130 having a plurality of base stations $BS_1$ 131, $BS_2$ 132, ..., $BS_{12}$ 142 each providing networking services to a respective geographic region. The number and arrangement of base stations $BS_1$ 131, $BS_2$ 132, ..., $BS_{12}$ 142 is illustrative, and may be substituted for any of a variety of alternative numbers and/or arrangements.

The BSs in the set of cells 130 may be connected to an Access Service Network (ASN) 110, e.g. each via a respective connection 115a, 115b, 115c, ... etc. Accordingly, a MS 150 may thereby access networked services via a base station servicing a geographic area in which MS 150 operates. By way of non-limiting example, MS 150 may include any of a variety of cell phones, personal digital assistants, handheld computers or similar mobile devices capable of wireless communication with a network such as wireless communication network 100. For example, MS 150 may initially operate in a region $R_1$ 151 serviced by base station $BS_8$ 138. In the absence of traffic exchange between MS 150 and its current serving BS $BS_8$ 138, battery power of MS 150 may be conserved by implementing a sleep mode—such as that defined in the IEEE 802.16 communication standard—wherein at least a portion of a MS is temporarily shut down to save power and the MS remains registered with its SBS. Sleep mode may to be distinguished from an idle mode, for example according to IEEE 802.16e-2005, wherein at least a portion of a MS is temporarily shut down to save power and the MS also deregisters from its SBS.

Region $R_1$ 151 may be in a sleep area of a sleep group SG1 180, e.g. a SG including respective areas serviced by $BS_2$ 132, $BS_3$ 133, $BS_8$ 138 and $BS_9$ 139. A different sleep group SG2 190 may include $BS_4$ 134, $BS_5$ 135, $BS_{10}$ 140 and $BS_{11}$ 141. The particular number, size and configuration of SGs in the set of cells 130, is merely illustrative as are the number and configuration of one or more base stations of any given SG. Any of a variety of additional and/or alternative arrangements of BSs and SGs in a set of cells may be used.

While operating in sleep mode, as represented by timeline 170, MS 150 may variously alternate between AI periods 171, 173, 175, 177 of listening for any traffic indicator message sent by its current SBS, and UAI periods 172, 174, 176, 178 during which MS 150 may power down its radio interface(s). Each BS in the set of cells 130 may broadcast in its coverage area an identifier indicating to an MS the region in which the MS is operating. While operating in idle mode, MS 150 may be in region $R_1$ 151 serviced by $BS_8$ 138 during a period $P_1$ 160, which is shown as time $(t_3-t_1)$. MS 150 may be in region $R_2$ 153 serviced by $BS_9$ 139 during a period $P_2$ 162 defined by time $(t_8-t_3)$ after migration 152 from region $R_1$ 151. However, if time $t_3$ is during a UAI 172, MS 150 may only receive an indication that it is in region $R_2$ 153 during a next AI 173, defined by time $(t_5-t_4)$, after time $t_3$. Similarly, MS 150 may be in region $R_3$ 155 serviced by $BS_{10}$ 140 during a period $P_3$ 164 defined by time $(t_{12}-t_8)$ after migration 154 from region $R_2$ 153. However, if time $t_8$ is during UAI 172, MS 150 may only receive an indication that it is in region $R_3$ during a next AI 177, defined by time $(t_{10}-t_9)$, after time $t_8$. Similarly, it may only be during AI 177 that MS 150 receives an indication that it is no longer operating in sleep area 180.

During $P_1$ 160, the Access Service Network gateway ASN-GW 112 may have an indication that $BS_8$ 138 is the SBS of MN 150 stored in a database (not shown). In various WiMAX communication networks, one ASN gateway may have one or more BSs in its coverage area. MN 150 may receive broadcast messages of $BS_9$ 139 during AI 173 and determine that it is no longer in the coverage area $R_1$ 151 of its earlier SBS, $BS_8$ 138. However, there may not be a resulting UHO of MS 150, since MS 150 remains in SG1 180. However, during AI 177, MN 150 may determine that it has both crossed into the coverage area $R_3$ 155 of $BS_{10}$ 140 and into a sleep area of a different sleep group SG2 190, whereupon a UHO may be performed to update the serving BS of MS 150 to $BS_{10}$ 140. During this UHO, system elements such as $BS_{10}$ 140, $BS_8$ 138, and ASN-GW 112 may exchange different backbone signaling messages. Moreover, during this UHO, MS 150 and $BS_{10}$ 140 may exchange signaling messages over the air-link. At the completion of the UHO, the ASN-GW 112 may update its database to reflect that MN 150's serving BS has been changed from BS1 to BS2. As used herein, a sleep area refers to a geographic area containing one or more cells, wherein a MS operating in sleep mode in the sleep area does not perform a UHO as long as it remains in said sleep area. In other words, an MS in sleep mode may perform UHO only when it moves from one sleep area to another sleep area.

Eventually, MS 150 may have to come out of a sleep mode to exchange data traffic. If, during $P_3$ 164, traffic for MN 150 arrives at ASN-GW 112, for example, ASN-GW 112 may check its database for the current SBS of MN 150 and forward MN 150's traffic to $BS_{10}$ 140. For example, a foreign agent FA 114 of MS 150 may send to ASN-GW 112 downlink traffic for MS 150, e.g. on behalf of a home agent HA (not shown) of MS 150. $BS_{10}$ 140 may determine that MN 150 is in sleep mode and broadcast a MOB-TRF-IND message, e.g. containing the SLPIDs of one or more MSs including the SLPID of MN 150. MN 150 may receive the MOB-TRF-IND message during AI 177, and terminate sleep mode operation, returning to a connected mode. The particular BS configurations, the trajectory of MS 150, the UAI and AI intervals, etc. of FIG. 1 are merely illustrative, and techniques described herein may apply to any of a variety of additional and/or alternative network configurations, messaging sequences, etc.

Figure 2:
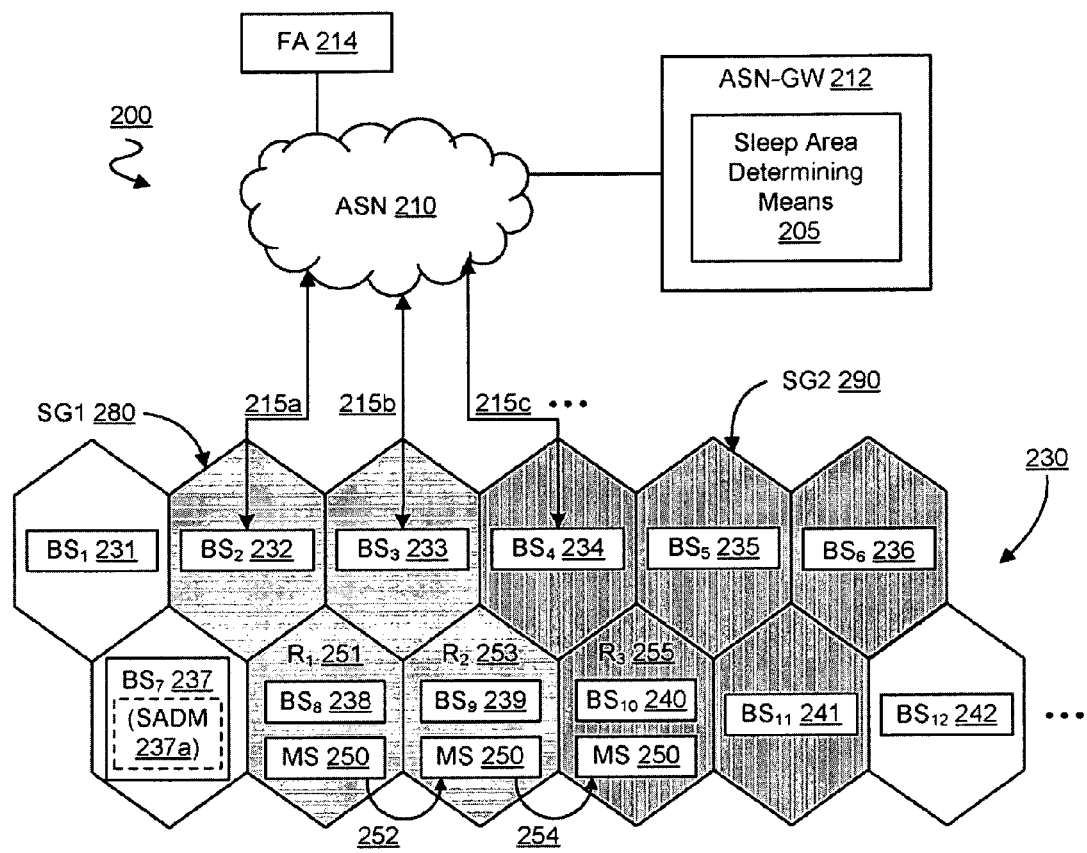
FIG. 2 is a block diagram illustrating select elements of a wireless communication network according to an embodiment.

FIG. 2 illustrates select elements of a wireless communication network 200 according to an embodiment of the invention. In certain embodiments, wireless communication network 200 may variously include at least some of the components and/or features described herein with respect to wireless communication network 100. Wireless communication network 200 may include a set of cells 230 having a plurality of base stations $BS_1$ 231, $BS_2$ 232, ..., $BS_{12}$ 242 each providing communication services to a respective geographic region. The number and arrangement of base stations $BS_1$ 231, $BS_2$ 232, ..., $BS_{12}$ 242 is illustrative, and may be substituted for any of a variety of alternative numbers and/or arrangements. The BSs in the set of cells 230 may be connected to an Access Service Network (ASN) 210, e.g. each via a respective connection 215a, 215b, 215c, ... etc. Accordingly, a MS 250 may thereby access networked services via a base station servicing a geographic area in which MS 250 operates. Communications of MS 250 may be variously supported via FA 214 and/or ASN-GW 212, according to at least some related techniques described herein.

In an embodiment, MS 250 may operate in a sleep mode as described herein, e.g. during a migration 252 from a region $R_1$ 251 serviced by base station $BS_8$ 238 to a region $R_2$ 253 serviced by $BS_9$ 239 and during a migration 254 from region $R_2$ 253 to a region $R_3$ 255 serviced by $BS_{10}$ 240. Migration 254 may bring MS 250 from a sleep group SG1 280 to a sleep group SG2 290. In an embodiment, the sleep area of SG1 280 and SG2 290 may be different—e.g. the respective total number of BSs in SG1 280 and SG2 290 may differ. By way of non-limiting example, a sleep area of a given SG may, according to varying embodiments, be determined based on value of one or more dynamically changing communication characteristics. Wireless communication network 200 may include sleep area determining means 205 including, for example, any of a variety of combinations of component hardware and/or software means to determine a size of a sleep area based on the value of a dynamically changing communication characteristic. Although shown in FIG. 2 as residing in ASN-GW 212, it is understood that sleep area determining means 205 may, in various embodiments, reside in one or more additional or alternative components of wireless communication network 200, including but not limited to the ASN 210 itself, MS 250 and/or a BS such as one or $BS_1$ 231 to $BS_{12}$ 242. In order to avoid obscuring certain aspects of the various embodiments, a discussion herein relates to a sleep area determining means 205 residing in an ASN-GW 205. An advantageous embodiment includes one or more additional and/or alternative sleep area determining means residing in respective base stations, as illustrated by SADM 237a of $BS_7$ 237.

In various embodiments, a sleep area may be determined based on a dynamically changing characteristic in order to reduce the use of communications resources in a wireless communication network for communications supporting idle mode operation of an MS. As discussed herein with respect to FIG. 1, both air-link signaling messages (i.e., messages exchanges between the MS and its SBS) as well as backbone signaling messages (i.e., messages variously exchanged between one or more of a MS's SBS, a target BS, a ASN-GW, etc.) may be used in implementing a UHO. The amount of resources used for air-link signaling messages which support implementation of a UHO may be denoted by $U_a$. Similarly, the amount of resources used for backbone signaling messages which support implementation of a UHO may be denoted by $U_b$. Such resources may include, but are not limited to, data processing cycles, air-link channel frequency, air-link channel time, backbone medium (e.g., wireline) bandwidth, backbone medium (e.g., wireline) time, memory, buffer space, and/or any other such limited feature of a wireless network system—e.g. in a MS, one or more BSs, an ASN, etc.—which may be available and at least partially consumed in the course of sending, receiving and/or processing a communication signal exchanged in the wireless network. In general, air-link resources are costlier than backbone resources. To account for this fact, relative weights $w_a$ and $w_b$ may be given to the respective air-link and backbone resources. Thus, the effective amount of resources used in support of implementing a single UHO may be represented by $$\alpha = w_a U_a + w_b U_b \quad (1)$$

The particular valuation of individual resources in determining their respective contributions to either of $U_a$ and $U_b$—and the particular valuation of weights $w_a$ and $w_b$—is dependent on the particular configuration of the wireless network in question, and is therefore implementation-specific. In an embodiment, $U_a$ and/or $U_b$ may depend on the protocols used for a UHO, making a dependent on such protocols as well. For example $U_a$ may be calculated by adding the air-link resources used in the messages exchanged between the MS and it's target BS (SBS) during a UHO. Similarly, $U_b$ may be calculated by adding the backbone resources used in the signaling messages exchanged between MS's SBS, AGW, etc. in support of a UHO.

The amount of resources used for air-link signaling messages per MS used by a single BS for communications related to a traffic indication message may be denoted by $M_a$. Similarly, the amount of resources used for backbone signaling messages used per MS by a single BS during sleep mode may be denoted by $M_b$. As discussed earlier using $w_a$ and $w_b$ as the weights of air-link and backbone resources, the effective amount of resources used per MS for communications related to a traffic indication message may be given by $$\beta = w_a M_a + w_b M_b \quad (2)$$

$M_a$ and/or $M_b$, and thus $\beta$, may depend on a protocol used for supporting a sleep mode. It may be noted that $w_a$ in Eq (1) and Eq (2) could be same or different. Similarly, $w_b$ in Eq (1) and Eq (2) could be same or different. For ease of illustration in the following discussion, each of $w_a$ and $w_b$ is considered to be same in both Eq (1) and Eq (2). However, it may be noted that the following discussion and analysis can be easily extended to scenarios where $w_a$ and/or $w_b$ are different in Eq (1) and Eq (2). In an embodiment, $M_a$ may be determined by calculating the air-link resources used per MS by a single BS in a MOB_TRF-IND message. Similarly, $M_b$ may be calculated by adding the backbone resources used in the signaling messages exchanged between BSs, AGW/FA, etc., e.g. in support of indicating to the MS the presence of data traffic.

A sleep instance may be defined as the event from the time an MS enters into sleep mode until the time it returns to a connected mode. Accordingly, an MOB_TRF-IND message may be used for a particular sleep mode MS once, i.e., to terminate the sleep instance of the said MS. However, the number of UHOs performed by the MS may depend on how many cell boundaries the MS crosses during the sleep instance. Thus, the total air-link as well as backbone resources used by the MS during a sleep instance may depend on the number of UHOs performed by the MS during a sleep instance. For example, the following parameters represent at least some of the one or more dynamically changing characteristics values which may be used to determine a number of UHOs performed by an MS during a sleep instance.

Average speed of the sleep mode MS=E[v]

Average duration of the sleep instance of the sleep mode MS=E[Ts]

Radius of a sleep group (SG)=R

As used herein, a value of a dynamically changing characteristic may include one or more of a past, present, expected, actual, average and/or estimated value of said characteristic. Information representing a speed value of an MS may be generated using any of a variety of existing methods. For example, the MS itself may use existing techniques to determine (e.g. at the physical layer of the MS) a Doppler spread in the envelope of a received signal—a technique known as velocity estimation using power spectral density (VEPSD). Alternatively or in addition, the MS and/or other components of the communications network could use the number of handoffs performed during a particular period and use information about the cell size to determine an average speed of the MS. Alternatively or in addition, a speed value of an MS may be determined by the MS and/or by other network components using information from other systems, such as global positioning satellite (GPS) data. Depending on the particular network implemented and/or the capabilities of a given MS, the MS and/or another network component may inform the Sleep Area Determining Means about the average speed of an MS.

The average duration of the sleep instance may depend, for example, on the time between two consecutive power state changes of a MS. This could depend on characteristics of the user of the MS such as typical location and/or travel behavior. The MS or network may learn about the average idle instance of an MS using the received call pattern of the user using the MS. Then the MS or the network may inform the Sleep Area Determining Means about the average idle instance of an MS.

SG residency time may be defined as the average time duration during which an MS resides in a particular SG. SG residency time of an MS may depend on its average speed and the SG radius. Moreover, the SG residency time of an MS in a particular SG may depend on the trajectory of MS during its stay in the said SG. The average value of SG residency time may be denoted by $E[T_c]$. For purposes of illustration, features of various embodiments are described using the SG residency time formulation given by eq. (3). It may be noted that other formulations of SG residency time may be used. In an embodiment, an average SG residency time, $E[T_c]$, may be given by $$E[T_c] = \frac{\pi R}{2E[v]} \quad (3)$$

Thus, on average the MS in sleep mode may reside in one SG for $E[T_c]$ time. Therefore, an estimate of the number of UHOs performed by the sleep mode MS during a single sleep instance may be based on an estimate of the number of times the MS moves from one SG to another. For example, based on an average time $E[T_s]$ of a sleep instance of an MS, and the average time $E[T_c]$ that the MS spends in a particular SG, the number of UHOs may be determined by dividing $E[Ts]$ by $E[T_c]$. Thus, an estimated number of UHOs $E[h]$ during a single sleep instance of the MS may be given by $$E[h] = \frac{E[T_s]}{E[T_c]} \quad (4)$$
$$= \frac{2E[T_s]E[v]}{\pi R}$$

Using equations (1), (2), and (4), a total amount of resources, L, used by a sleep mode MS during a single sleep instance to carry the signaling messages during UHOs and sleep mode may be given by $$L = E[h]\alpha + N\beta \quad (5)$$
$$= \frac{2E[T_s]E[v](w_a U_a + w_b U_b)}{\pi R} + \frac{R^2(w_a M_a + w_b M_b)}{r^2}$$

where N is the number of cells of radius r in the sleep area of radius R and may be given by $$N = \frac{\pi R^2}{\pi r^2} = \frac{R^2}{r^2} \quad (6)$$

It is apparent from eq. (5) that, for different sleep mode MSs in a WiMAX network having different average speeds $E[v]$, for example, the amount of resources used by different MSs may vary. Even assuming that all other parameters have same value for each sleep mode MS, the amount of resources used for communications needed to support a sleep mode MS with higher average speed $E[v]$ may be more than the amount of resources used for communications needed to support a sleep mode MS with lower average speed. However, in various embodiments, the total number of resources L may depend on any of a variety of combinations of dynamically changing variables including, but not limited to, those of eq. (5).

Wireless network performance may be improved by reducing L in Eq. (5). By way of non-limiting example, the radius of the SG for a particular sleep mode MS may be determined based on an average speed of the sleep mode MS in such a way that the amount of resources, L, used by a sleep mode MS during a single sleep instance may be reduced. The SG that achieves reduced L is hereafter referred to as low-resource SG. The radius of low-resource SG may be determined by finding the value of R—hereafter referred to as $R_{min}$—that reduces the L in Eq. (5), e.g. as described below.

In an embodiment, the value of R where L attains a local minimum value may be determined by solving the following equation:

$$\frac{dL}{dR} = 0 \quad (7)$$

A value of R that satisfies Eq. (7) may be given by $$R = \left[\frac{E[T_s]E[v](w_a U_a + w_b U_b)}{\pi(w_a M_a + w_b M_b)}\right]^{\frac{1}{3}} r^{\frac{2}{3}} \quad (8)$$

A second derivative of L, i.e., $$\frac{d^2 L}{dR}$$

establishes that the R of eq. (8) is a local minima $R_{min}$, where L increases for other neighboring R values. Accordingly, eq. (8) shows that, in an embodiment, a sleep MS with higher average speed may have a higher $R_{min}$ compared to a sleep mode MS with lower average speed. It may be noted that in this illustration, $R_{min}$ is determined by considering $E[v]$ as the only dynamically changing variable. However, in one embodiment more than one dynamically changing variables could be used to determine $R_{min}$.

Thus, for a particular sleep mode MS, the radius of a sleep area for low-resource SG may be determined using eq. (8). Once $R_{min}$ is determined for a sleep mode MS, a number of BSs, N, in the said low-resource SG may be calculated using $$N = \text{round}\left(\frac{R_{min}^2}{r^2}\right) \quad (9)$$

Where round function determines the nearest integer. Alternatively or in addition, functions such as $$\text{floor}\left(\frac{R_{min}^2}{r^2}\right) \text{ or } \text{ceil}\left(\frac{R_{min}^2}{r^2}\right)$$

may be used to determine the number of cells in the minimum-resource SG for the said sleep mode MS. In various embodiments, alternative and/or additional techniques for calculating a sleep area based on dynamically changing communication characteristics may be used, e.g. to determine the number of cells in a low-resource SG. The communication characteristic may include a characteristic of a communication in a wireless network and/or a characteristic of one or more devices (e.g. MS and/or BS) capable of communicating in said wireless network. In an embodiment, the communication characteristic may include a physical characteristic of the MS affecting communications such as a speed of the MS traveling through a geographic area of a wireless communication network. Other examples of dynamically changing communication characteristics which may be used to determine a paging area include, but are not limited to, one or more of parameters $E[v]$, $E[T_s]$, $U_a$, $U_b$, $M_a$, $M_b$, $w_a$ and/or $w_b$ discussed herein. A device in the wireless communication network suitably configured to generate respective data representing a changed value of a communication characteristic may communicate said data for use by the sleep area determining means according to techniques described herein.

In various embodiments, MS speed is at least one characteristic which determines a sleep area of a sleep group to which the MS is to be assigned. In one embodiment, the sleep area may be determined based on a comparison of an average speed of the MS to a set of speed ranges associated with respective sleep areas. For example, three different sleep areas may be associated with respective low average MS speed (e.g. $E[v]<30$ km/h), medium average MS speed (e.g. $30<E[v]\leq60$ km/h), and high average MS speed (e.g. $E[v]\leq60$ km/h). It is appreciated that the total numbers of such speed ranges, the particular speeds associated with each speed range and the particular sleep area associated with each speed range may vary according to constraints and requirements of the particular wireless communication network.

In an embodiment, the mean value of the speed for each sleep mode MS group can be used in eq. (8) to determine the $R_{min}$ for each sleep mode MS speed range. In the above example, $R_{min}$, $R_{minM}$, $R_{minH}$, which represent the respective $R_{min}$ values for low, medium, and high average speed ranges for sleep mode MSs, may each be calculated according to eq. (8) using $E[v]=15$ km/h, 45 km/h and 90 km/h, respectively. Similarly, the respective number of cells $N_L$, $N_M$ and $N_H$, may be assigned to the low, medium, and high average speed ranges for sleep mode MSs, e.g. according to respective calculations according to eq. (9). Thereafter, a particular MS may then be assigned a sleep group of $N_L$, $N_M$ or $N_H$ cells, depending on whether its average speed is within one of the corresponding speed ranges.

Figure 3:
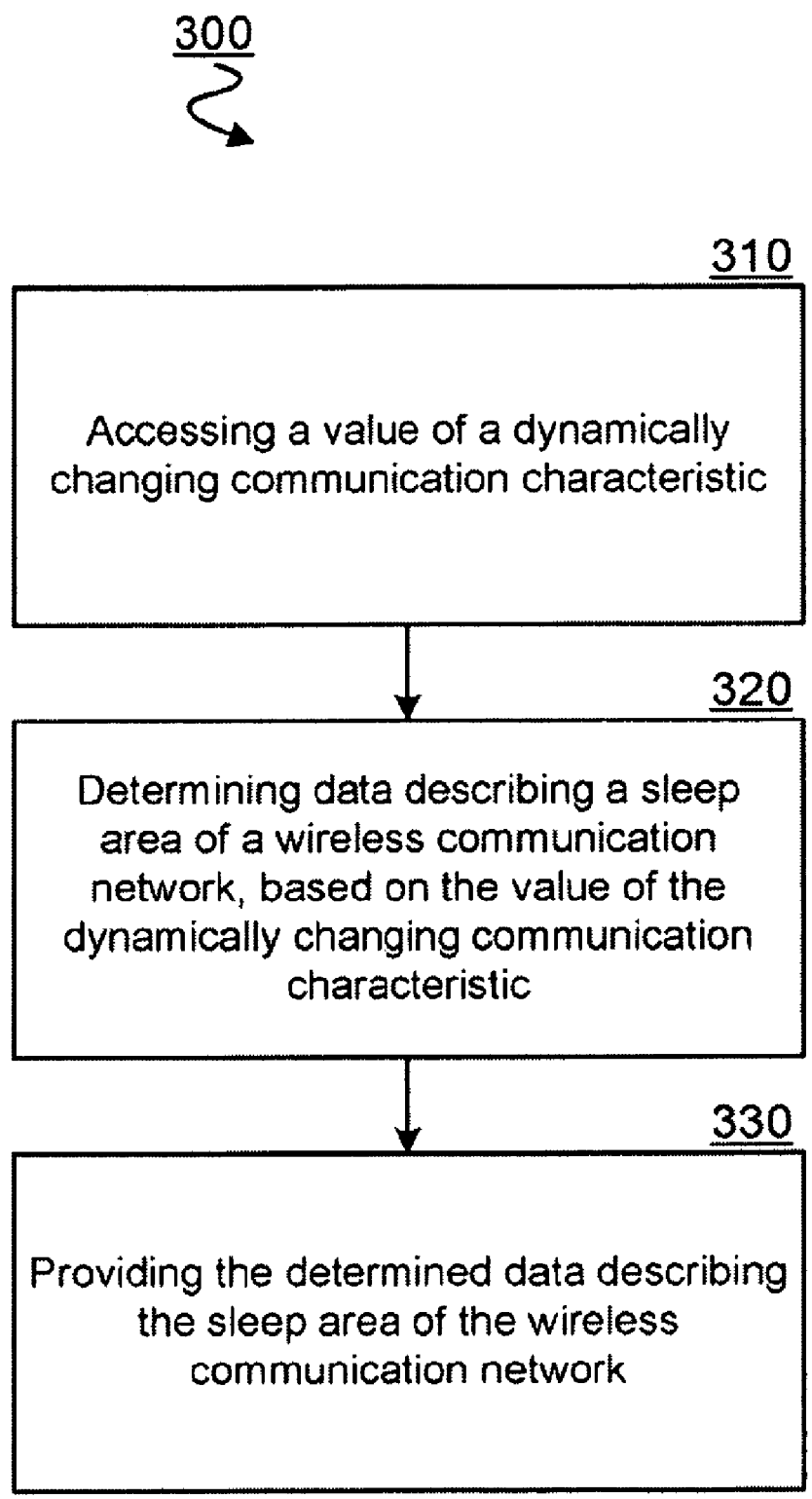
FIG. 3 is a flow diagram illustrating select elements of method of determining a sleep area according to an embodiment.

FIG. 3 illustrates select elements of a method 300 for determining a sleep area according to an embodiment. According to various embodiments, the method may be performed in wireless communication network 100. By way of non-limiting example, the method 300 may be performed by sleep area determining means 205. In various embodiments, method 300 may be performed by MS 250, by one or more of base stations $BS_1$ 231, $BS_2$ 232, ..., $BS_{16}$ 248, and/or any data processing means of a component of ASN-GW 210 (not shown) suitably configured to perform the determinations described herein. At 310, a value of a dynamically changing communication characteristic may be accessed. The characteristic may include any of a variety of attributes or capabilities related to a communication, actual or potential, including but not limited to one or more qualities, features, modes, etc. of the communication itself and/or of a communication channel, device and/or system supporting said communication. At 320, data describing a sleep area of a wireless communication network may be determined based on the accessed value of the dynamically changing communication characteristic. At 330, the data describing the sleep area may be provided as an output.

Figure 4:
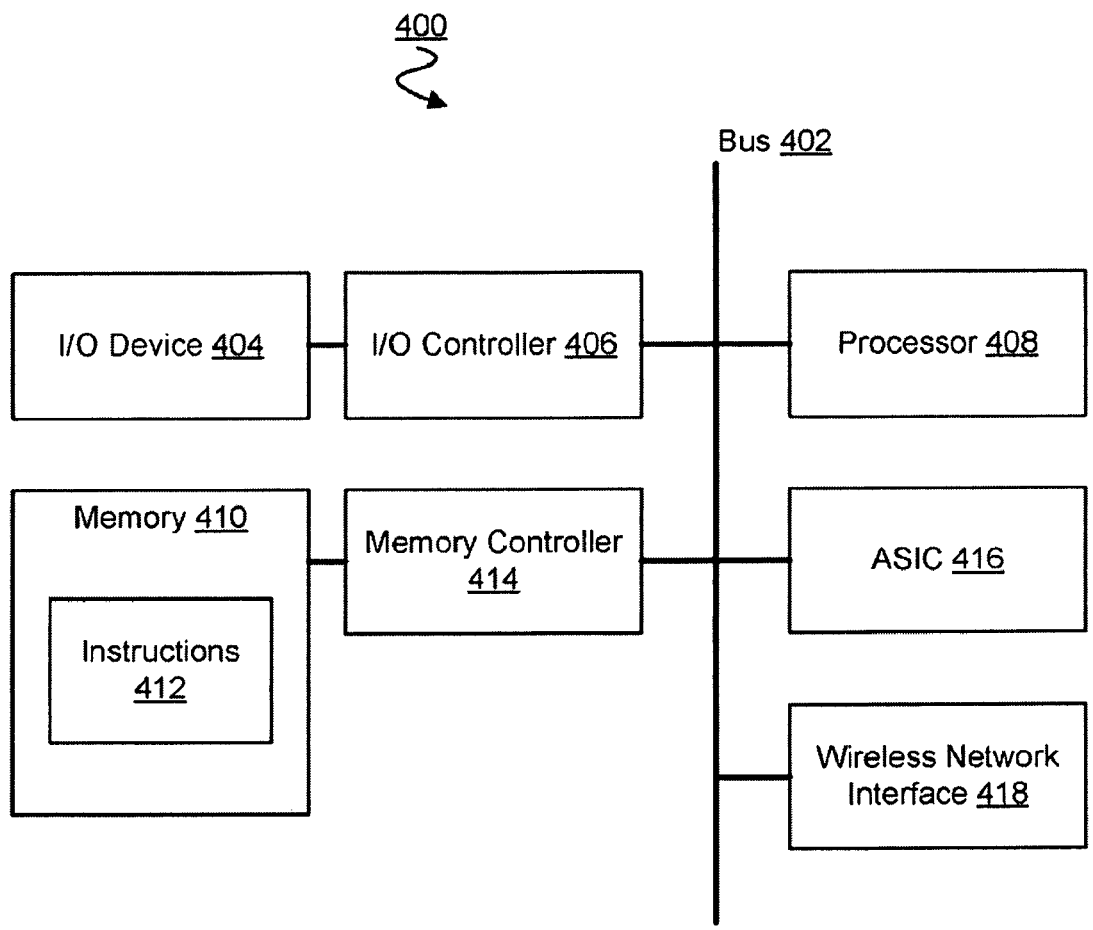
FIG. 4 is a block diagram illustrating select elements of an apparatus according to an embodiment.

FIG. 4 illustrates select elements of an apparatus 400 according to an embodiment. The apparatus 400 may include a mobile station such as MS 250 capable of communicating in a wireless communication network. In various alternate embodiments, apparatus 400 may include a base station such as one of base stations $BS_1$ 231, $BS_2$ 232, ..., $BS_{16}$ 248. Alternatively, apparatus 400 may be some other device in a wireless communication network such as wireless network 100, e.g. a data processing component of ASN 100 (not shown) configured to determine various data according to techniques set forth herein. By way of non-limiting example, apparatus 400 may be configured to determine a sleep area according to techniques such as those discussed herein with respect to FIG. 4.

In various embodiments, a bus 402 may interconnect various components of apparatus 400 to provide for data exchanges. Bus 402 may represent any of a variety of combinations of shared and/or dedicated buses, including but not limited to one or more data buses, control buses and/or input/output (I/O) buses. An I/O device 404 of apparatus 400 may be coupled to bus 402, e.g. via an I/O controller 406, to exchange information related to the determining of a sleep area. By way of non-limiting example, I/O device 404 may include, for example, one or more of a keyboard, video screen, touch screen, mouse, mouse pad, speaker or similar device to exchange information with a user. Alternatively or in addition, I/O device 404 may include any of a variety of wired devices such as a modem to exchange such information with another device, e.g. via a wired connection.

A memory 410 of apparatus 400 may be coupled to bus 402, e.g. via a memory controller 414, to store data exchanged on bus 402. Memory 410 may, for example, include any of a variety of combinations of a read-only memory (ROM), a random access memory (RAM), a cache memory, a disk drive or any similar data storing means. By way of non-limiting example, memory 410 may store data describing a value of a dynamically changing communication characteristic and/or data describing a sleep area of a wireless communication network Apparatus 400 may further include a processor 408 including one or more data processing units to perform various data processing techniques as described herein, e.g. determining data describing a sleep area of a wireless communication network. In an embodiment, processor 408 may perform said data processing techniques in response to an execution of one or more computer-readable instructions—e.g. instructions 412 stored in memory 410. Alternatively or in addition, apparatus 400 may include an application specific integrated circuit (ASIC) 416 to provide a hardware implementation of one or more data processing techniques discussed herein. Although an ASIC 416 is shown, it is understood that any of a variety of additional and/or alternative hardware components, including but not limited to a programmable ROM (PROM) an erasable PROM (EPROM) or similar device may operate as logic to variously perform one or more of the data processing techniques set forth herein.

The instructions 412 may include data structures embodying or utilized by any one or more of the methodologies or functions described herein. The instructions 412 may reside, completely or at least partially, within the main memory 410 and/or within the processor 408 during execution thereof by the apparatus 400, e.g. where the processor 402 also includes machine-readable media.

While the memory 410 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

Figure 5:
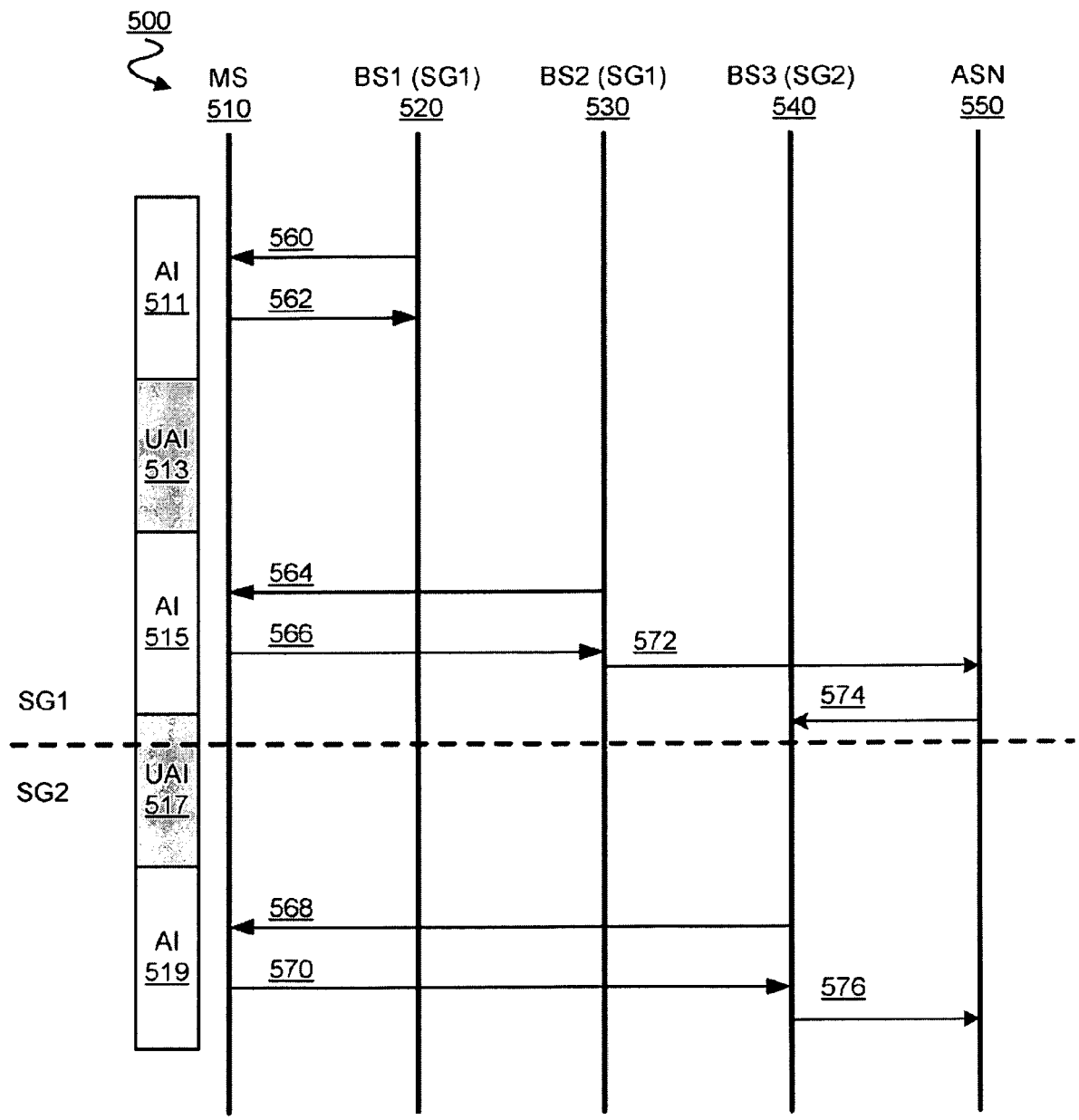
FIG. 5 is a swim lane diagram illustrating select elements of communications in a wireless communication network according to an embodiment.

FIG. 5 illustrates select elements of an exchange 500 of messages within a wireless network system according to an embodiment. The message exchange 500 may occur within wireless communication network 100, for example. In an exemplary embodiment, the wireless communication network may include base stations BS1 520, BS2 530 and BS3 540. The base stations may service respective geographic areas and provide access to an ASN 550. More particularly, base stations BS1 520 and BS2 530 may service respective regions of a sleep area of sleep group SG1, while base station BS3 540 may service a region of a sleep area of sleep group SG2.

According to an embodiment, an MS 510 may initially be operating in a sleep mode while in the sleep area of SG1, e.g. in a region serviced by BS1 520. While operating in sleep mode, MS 510 may alternate between PLI periods 511, 515, 519 and PUI periods 513, 517. At the time of PLI period 511, MS 510 may be located in a regions serviced by BS1 520, with which messages 560, 562 may be exchanged. Similarly, at the time of PLI period 515, MS 510 may be located in a regions serviced by BS2 530, with which messages 564, 566 may be exchanged. However, at the time of PLI period 519, MS 510 may be located in a region of SG2 serviced by BS3 540, whereupon MS 150 may determine—e.g. via messages MOB-TRF-IND message 568—that MS 510 is no longer located in SG1.

At this point, MS 510 may initiate a UHO from a base station of SG1 to the base station BD3 of SG2. This UHO may be indicated at least in part by the message 570 from MS 510 to BS3 540. In various embodiments, information describing the new sleep area for MS 510 may be provided to MS 510 during the exchange of handoff messages 568, 570, 572, 574, 476. Alternatively or in addition, MS 510 may receive information describing a new sleep area when data traffic is being forwarded to MS 510.

In the illustrative example of FIG. 5, BS3 540 provides an indication 572 to ASN 550 that a handoff for MS 510 is taking place. ASN 550 may access or have previously accessed a value of a dynamically changing communication characteristic, e.g. related to communications of MS 510. Based on the value of a dynamically changing communication characteristic, ASN 550 may determine a sleep area of the wireless network, and provide an indication of the determined sleep area to BS3 540. In turn, BS3 540 may assign a sleep group SG2 to MS 510 or otherwise communicate an indication 576 of the determined sleep area of SG2.

The size of a sleep area for a particular MS in sleep mode may be based on characteristics such as a speed of the MS, an average duration of sleep mode operation (this is typically the duration between the time when the MS enters the sleep mode and the time when it exit the sleep mode), a signaling overhead required for the operations involved when a sleep mode MS moves from one sleep area to another, and a signaling overhead required for the operations involved when a sleep mode MS needs to be notified of its traffic arrival at the network.

Techniques and architectures for wireless communication are described herein. In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
    accessing a value of a physical characteristic of a mobile station operating in a wireless communication network;
    determining a sleep area of the wireless communication network, the determining including identifying, based on the accessed value for the physical characteristic of the mobile station, information which is based on a derivative of a function with respect to a sleep area radius, the function representing an estimate of resources used in a single sleep state, wherein the estimate of resources used varies with the physical characteristic; and
    storing data describing the determined sleep area of the wireless communication network.

2. The method of claim 1, wherein the physical characteristic includes a speed of the mobile station.

3. The method of claim 1, wherein determining the sleep area further comprises determining a local minima of resource consumption for a range of sleep area values.

4. The method of claim 1, wherein the estimate of resources used in the single sleep state includes an estimate of at least one of resources consumed for communications associated with performing an uncontrolled handoff of the mobile station, and resources consumed for communications associated with a sleep group transmitting a traffic indication message.

5. The method of claim 1, wherein the data describing the determined sleep area includes data describing a number of base stations to be included in a sleep group.

6. The method of claim 5, further comprising
    defining a set of speed ranges;
    associating each speed range in the set of speed ranges with a respective number of cells; and
    wherein determining the sleep area of the wireless communication network includes
        determining that a speed of the mobile station is within one of the set of speed ranges, and
        assigning to the mobile station a sleep group having the number of cells associated with the one of the set of speed ranges.

7. The method of claim 6, wherein associating each speed range in the set of speed ranges with the respective number of cells includes determining a number of cells based on a mean speed of a speed range in the set of speed ranges.

8. The method of claim 5, wherein storing data describing the sleep area includes transmitting an indication that the mobile station is assigned to the sleep group.

9. The method of claim 1, wherein determining the sleep area of the wireless communication network includes determining at a base station of the wireless communication network.

10. An apparatus comprising:
    a network interface to receive from a wireless communication network an indication of a speed of a mobile station in the wireless communication network;
    a sleep area determining means coupled to the network interface for determining a sleep area to be assigned to the mobile station, wherein the sleep area determining means identify, based on the indicated speed of the mobile station, information which is based on a derivative of a function with respect to a sleep area radius, the function representing an estimate of resources used in a single sleep state, wherein the estimate of resources used varies with mobile station speed; and
    a memory coupled to the sleep area determining means to store data indicating the determined sleep area.

11. The apparatus of claim 10, wherein the sleep area determining means includes means for determining a local minima of resource consumption for a range of sleep area values.

12. The apparatus of claim 10, wherein the estimate of resources used in the single sleep state includes an estimate of at least one of resources consumed for communications associated with performing an uncontrolled handoff of the mobile station, and resources consumed for communications associated with a sleep group transmitting a traffic indication message.

13. The apparatus of claim 10, the network interface further to transmit to the wireless communication network an indication that the mobile station is assigned to a sleep group having a number of cells based on the determined sleep area.

14. The apparatus of claim 10, the memory further to store data describing a set of speed ranges and an associated number of cells for each speed range in the set of speed ranges, and wherein the sleep area determining means includes,
    means for determining that a speed of the mobile station is within one of the set of speed ranges, and
    means for assigning to the mobile station a sleep group having a number of cells equal to the number of cells associated with the one of the set of speed ranges.

15. The apparatus of claim 10, wherein the sleep area determining means includes means for determining the sleep area to be assigned to the mobile station based on an expected duration of a sleep instance of the mobile station.

16. A method comprising:
    moving through a geographic area of a wireless communication network;
    transmitting to a communications device in the wireless communication network data describing a speed associated with the moving through the wireless communication network, wherein a sleep group is determined in response to the transmitting the data describing the speed, the determining the sleep group including identifying, based on the data describing the speed, information which is based on a derivative of a function with respect to a sleep area radius, the function representing an estimate of resources used in a single sleep state, wherein the estimate of resources used varies with a speed of movement through the wireless communication network; and
    receiving from the communications device an indication that the sleep group has been assigned.

17. The method of claim 16, further comprising:
    in response to receiving the indication that the sleep group has been assigned, operating in a sleep mode of communication according to the assigned sleep group.

18. The method of claim 16, wherein the communications device in the wireless communication network includes a base station.

* * * * *

UNITED STATES PATENT AND TRADEMARK OFFICE
CERTIFICATE OF CORRECTION

PATENT NO. : 8,359,037 B2
APPLICATION NO. : 12/165438
DATED : January 22, 2013
INVENTOR(S) : Mohanty et al.

Page 1 of 1

It is certified that error appears in the above-identified patent and that said Letters Patent is hereby corrected as shown below:

In the Specifications

In column 9, line 18 delete, "$30 < E[v] \leqq 60$ km/h)," and insert -- $30 \leq E[v] < 60$ km/h), --.

In column 9, line 19 delete, "$\leqq 60$ km/h)." and insert -- $\leq 60$ km/h). --.

In column 9, line 27 delete, "$R_{min}$," and insert -- $R_{minL}$, --.

Signed and Sealed this
Twenty-ninth Day of April, 2014

Michelle K. Lee
*Deputy Director of the United States Patent and Trademark Office*